United States Patent
Ben Dayan et al.

(10) Patent No.: US 11,809,707 B2
(45) Date of Patent: *Nov. 7, 2023

(54) FILE OPERATIONS IN A DISTRIBUTED STORAGE SYSTEM

(71) Applicant: Weka.IO Ltd, Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL)

(73) Assignee: Weka.IO Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/459,663

(22) Filed: Aug. 27, 2021

(65) Prior Publication Data

US 2022/0043571 A1 Feb. 10, 2022

Related U.S. Application Data

(63) Continuation of application No. 16/121,508, filed on Sep. 4, 2018, now Pat. No. 11,262,912.
(Continued)

(51) Int. Cl.
*G06F 3/06* (2006.01)
*G06F 16/182* (2019.01)

(52) U.S. Cl.
CPC .......... *G06F 3/0604* (2013.01); *G06F 3/0619* (2013.01); *G06F 3/0643* (2013.01);
(Continued)

(58) Field of Classification Search
CPC .... G06F 3/0604; G06F 3/0619; G06F 3/0643; G06F 3/0656; G06F 3/0688; G06F 16/182
See application file for complete search history.

(56) References Cited

U.S. PATENT DOCUMENTS

| 6,034,831 A | 3/2000 | Dobbek et al. |
| 2005/0144387 A1 | 6/2005 | Adl-Tabatabai |

(Continued)

FOREIGN PATENT DOCUMENTS

WO WO-2006065655 A1 * 6/2006 ......... G06F 12/0246

OTHER PUBLICATIONS

Chinese Office Action Appln No. 2018800863604 dated Jul. 22, 2023.

*Primary Examiner* — Nanci N Wong
(74) *Attorney, Agent, or Firm* — McAndrews, Held & Malloy, Ltd.

(57) ABSTRACT

A plurality of computing devices are communicatively coupled to each other via a network, and each of the plurality of computing devices is operably coupled to one or more of a plurality of storage devices. A plurality of failure resilient address spaces are distributed across the plurality of storage devices such that each of the plurality of failure resilient address spaces spans a plurality of the storage devices. The plurality of computing devices maintains metadata that maps each failure resilient address space to one of the plurality of computing devices. Each of the plurality of computing devices is operable to read from and write to a plurality of memory blocks, while maintaining an extent in metadata that maps the plurality of memory blocks to the failure resilient address space.

42 Claims, 5 Drawing Sheets

Related U.S. Application Data

(60) Provisional application No. 62/585,057, filed on Nov. 13, 2017.

(52) U.S. Cl.
CPC .......... *G06F 3/0656* (2013.01); *G06F 3/0688* (2013.01); *G06F 16/182* (2019.01)

(56) References Cited

U.S. PATENT DOCUMENTS

| | | | |
|---|---|---|---|
| 2010/0088287 A1* | 4/2010 | Taniguchi | G06F 16/2358 707/672 |
| 2011/0289049 A1* | 11/2011 | Zeng | G06F 16/22 707/769 |
| 2013/0173956 A1* | 7/2013 | Anderson | H03M 13/373 714/6.24 |
| 2016/0041878 A1 | 2/2016 | Davis et al. | |
| 2016/0210306 A1 | 7/2016 | Kumarasamy et al. | |
| 2017/0052847 A1 | 2/2017 | Ben Dayan et al. | |
| 2018/0004745 A1* | 1/2018 | Finkelstein | G06F 16/2255 |
| 2018/0011762 A1* | 1/2018 | Klein | G06F 11/1072 |
| 2018/0095872 A1* | 4/2018 | Dreier | H04L 67/1095 |
| 2019/0042091 A1* | 2/2019 | Raghunath | H04L 47/125 |
| 2020/0117372 A1* | 4/2020 | Corey | G06F 11/3034 |

\* cited by examiner

FILE OPERATIONS IN A DISTRIBUTED STORAGE SYSTEM

PRIORITY CLAIM

This application is a continuation of United States patent application 16/121,508, filed Sep. 4, 2018, which claims priority to United States provisional patent application 62/585,057 titled "File Operations In A Distributed Storage System" filed on Nov. 13, 2017, now expired. Each of the aforementioned documents are incorporated herein by reference in their entirety.

INCORPORATION BY REFERENCE

U.S. patent application Ser. No. 15/243,519 titled "Distributed Erasure Coded Virtual File System" is hereby incorporated herein by reference in its entirety.

BACKGROUND

Limitations and disadvantages of conventional approaches to data storage will become apparent to one of skill in the art, through comparison of such approaches with some aspects of the present method and system set forth in the remainder of this disclosure with reference to the drawings.

BRIEF SUMMARY

Methods and systems are provided for file operations in a distributed storage system substantially as illustrated by and/or described in connection with at least one of the figures, as set forth more completely in the claims.

DETAILED DESCRIPTION

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB "blocks" and 128 MB "chunks." "Extents" may be stored in volatile memory, e.g., RAM for fast access, backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the filesystem's namespace, this load can be distributed across a plurality of nodes.

Figure 1:
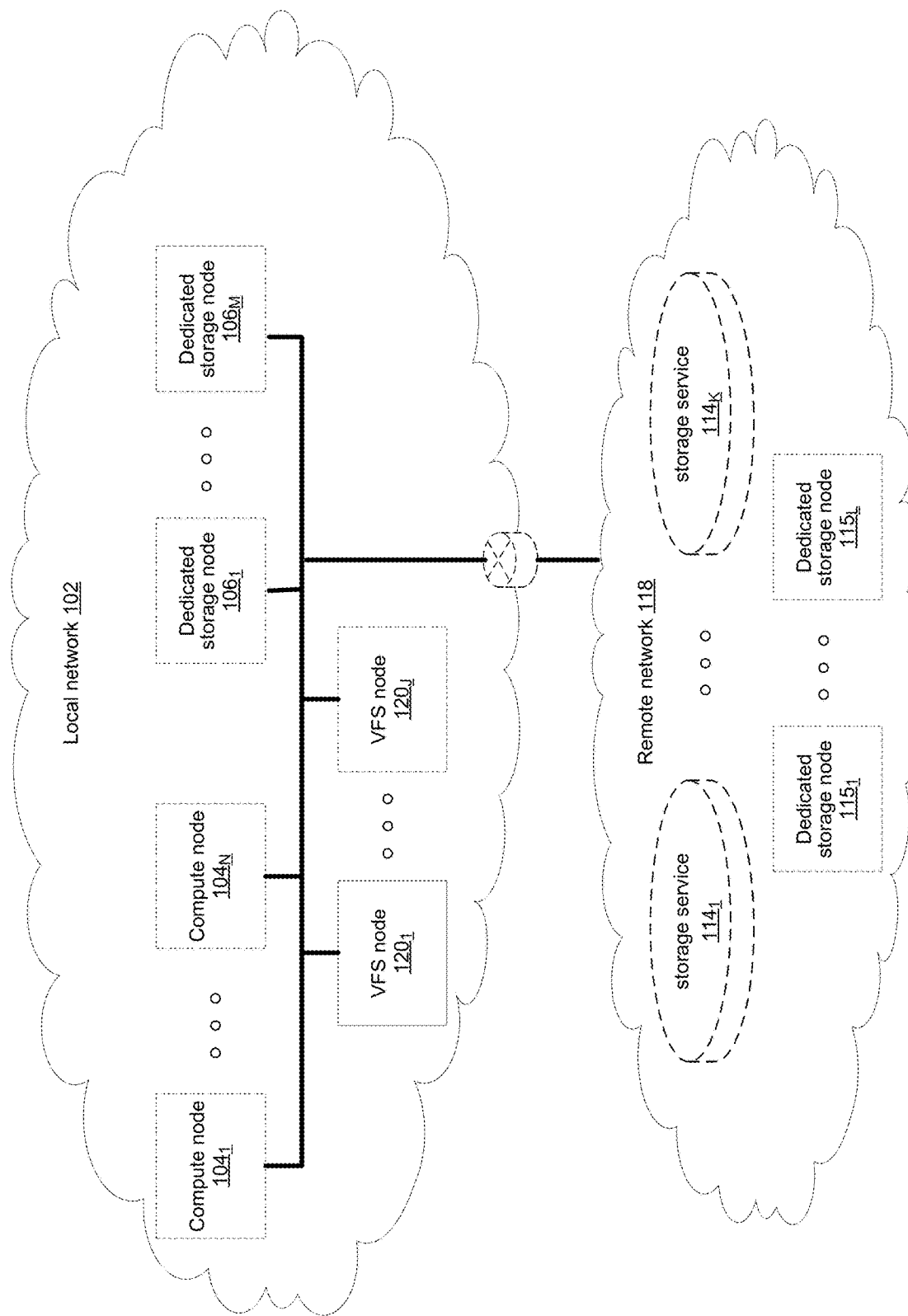
FIG. 1 illustrates various example configurations of a virtual file system in accordance with aspects of this disclosure.

FIG. 1 illustrates various example configurations of a virtual file system (VFS) in accordance with aspects of this disclosure. Shown in FIG. 1 is a local area network (LAN) 102 comprising one or more VFS nodes 120 (indexed by integers from 1 to J, for j≥1), and optionally comprising (indicated by dashed lines): one or more dedicated storage nodes 106 (indexed by integers from 1 to M, for M≥1), one or more compute nodes 104 (indexed by integers from 1 to N, for N≥1), and/or an edge router that connects the LAN 102 to a remote network 118. The remote network 118 optionally comprises one or more storage services 114 (indexed by integers from 1 to K, for K≥1), and/or one or more dedicated storage nodes 115 (indexed by integers from 1 to L, for L≥1).

Each VFS node $120_j$ (j an integer, where 1≤j≤J) is a networked computing device (e.g., a server, personal computer, or the like) that comprises circuitry for running VFS processes and, optionally, client processes (either directly on an operating system of the device $104_n$ and/or in one or more virtual machines running in the device $104_n$).

The compute nodes 104 are networked devices that may run a VFS frontend without a VFS backend. A compute node 104 may run VFS frontend by taking an SR-IOV into the NIC and consuming a complete processor core. Alternatively, the compute node 104 may run the VFS frontend by routing the networking through a Linux kernel networking stack and using kernel process scheduling, thus not having the requirement of a full core. This is useful if a user does not want to allocate a complete core for the VFS or if the networking hardware is incompatible with the VFS requirements.

Figure 2:
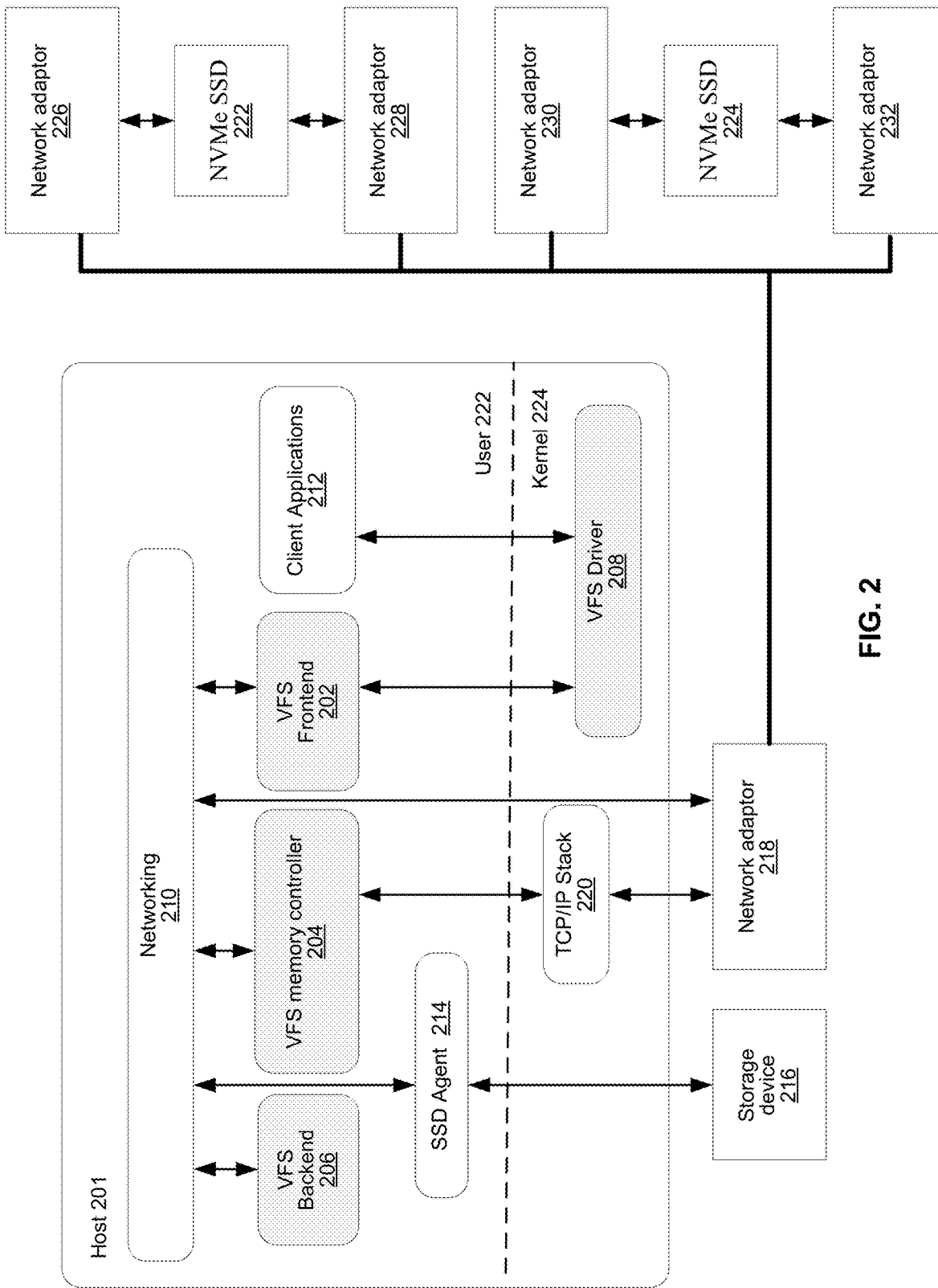
FIG. 2 illustrates an example configuration of a virtual file system node in accordance with aspects of this disclosure.

FIG. 2 illustrates an example configuration of a VFS node in accordance with aspects of this disclosure. A VFS node comprises a VFS frontend 202 and driver 208, a VFS memory controller 204, a VFS backend 206, and a VFS SSD agent 214. As used in this disclosure, a "VFS process" is a process that implements one or more of: the VFS frontend 202, the VFS memory controller 204, the VFS backend 206, and the VFS SSD agent 214. Thus, in an example implementation, resources (e.g., processing and memory resources) of the VFS node may be shared among client processes and VFS processes. The processes of the VFS may be configured to demand relatively small amounts of the resources to minimize the impact on the performance of the client applications. The VFS frontend 202, the VFS memory controller 204, and/or the VFS backend 206 and/or the VFS SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 to be present in order to serve them.

The VFS node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The VFS node may be serviced by an operating system and/or a virtual machine monitor (VMM) (e.g., a hypervisor). The VMM may be used to create and run the VFS node on a host 201. Multiple cores may reside inside the single LXC container running the VFS, and the VFS may run on a single host 201 using a single Linux kernel. Therefore, a single host 201 may comprise multiple VFS frontends 202, multiple VFS memory controllers 204, multiple VFS backends 206, and/or one or more VFS drivers 208. A VFS driver 208 may run in kernel space outside the scope of the LXC container.

A single root input/output virtualization (SR-IOV) PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage media 216 attached via a PCI Express (PCIe) bus. The non-volatile storage media 220 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD 216 with the SSD agent 214 and networking 210. Alternatively, the SSD may be implemented as a network-attached NVMe SSD 222 or 224 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 222 and 224 to transform them into networked NVMe-oF devices without the use of a server. The NVMe SSDs 222 and 224 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208.

The VFS driver 208 puts a corresponding request on a queue of the VFS frontend 202. If several VFS frontends exist, the driver may load balance accesses to the different frontends, making sure a single file/directory is always accessed via the same frontend. This may be done by "sharding" the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

The VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

The VFS SSD agent 214 handles interactions with a respective storage device 216. This may include, for example, translating addresses, and generating the commands that are issued to the storage device (e.g., on a SATA, SAS, PCIe, or other suitable bus). Thus, the VFS SSD agent 214 operates as an intermediary between a storage device 216 and the VFS backend 206 of the virtual file system. The SSD agent 214 could also communicate with a standard network storage device supporting a standard protocol such as NVMe-oF (NVMe over Fabrics).

Figure 3:
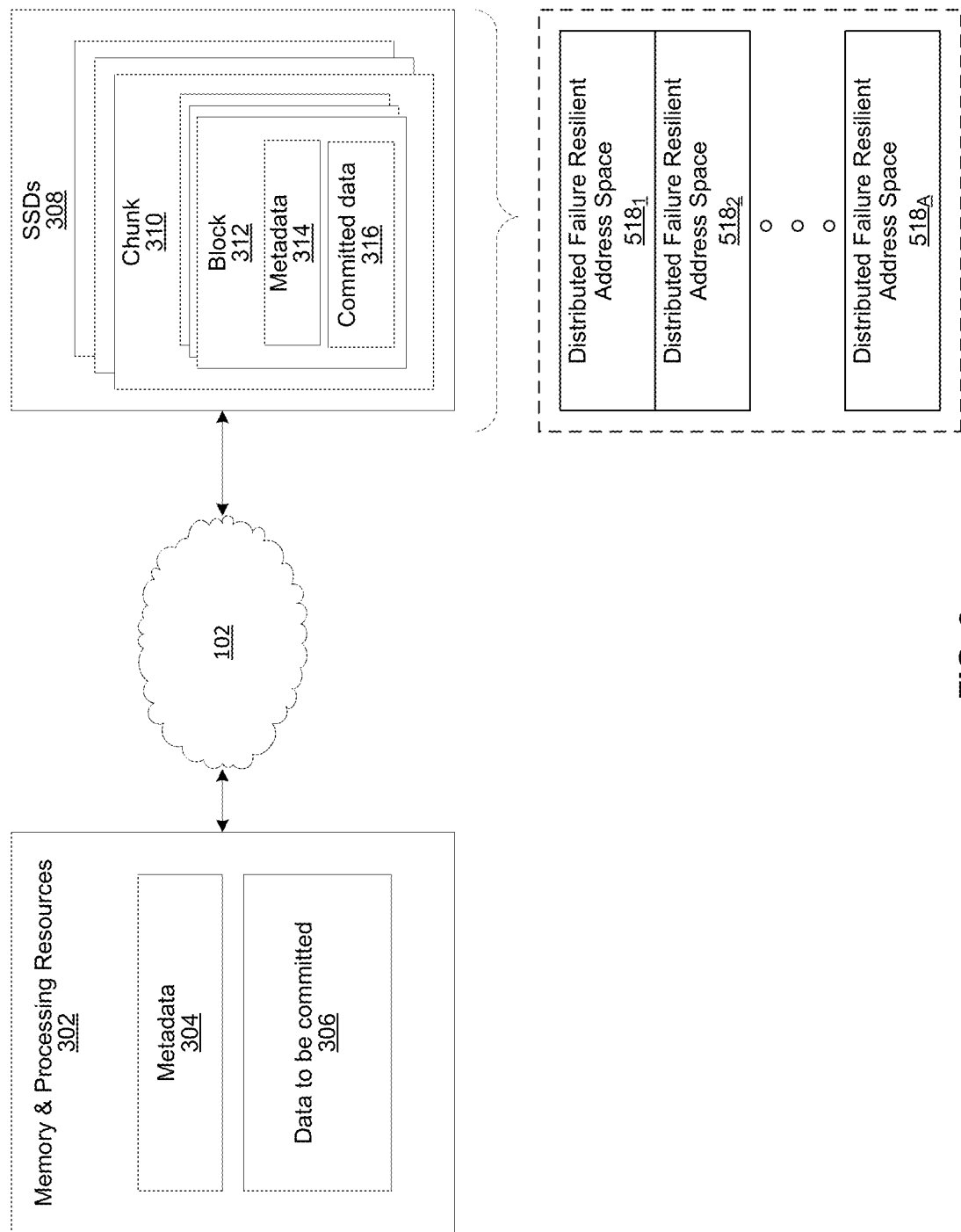
FIG. 3 illustrates another representation of a virtual file system in accordance with an example implementation of this disclosure.
Figure 4:
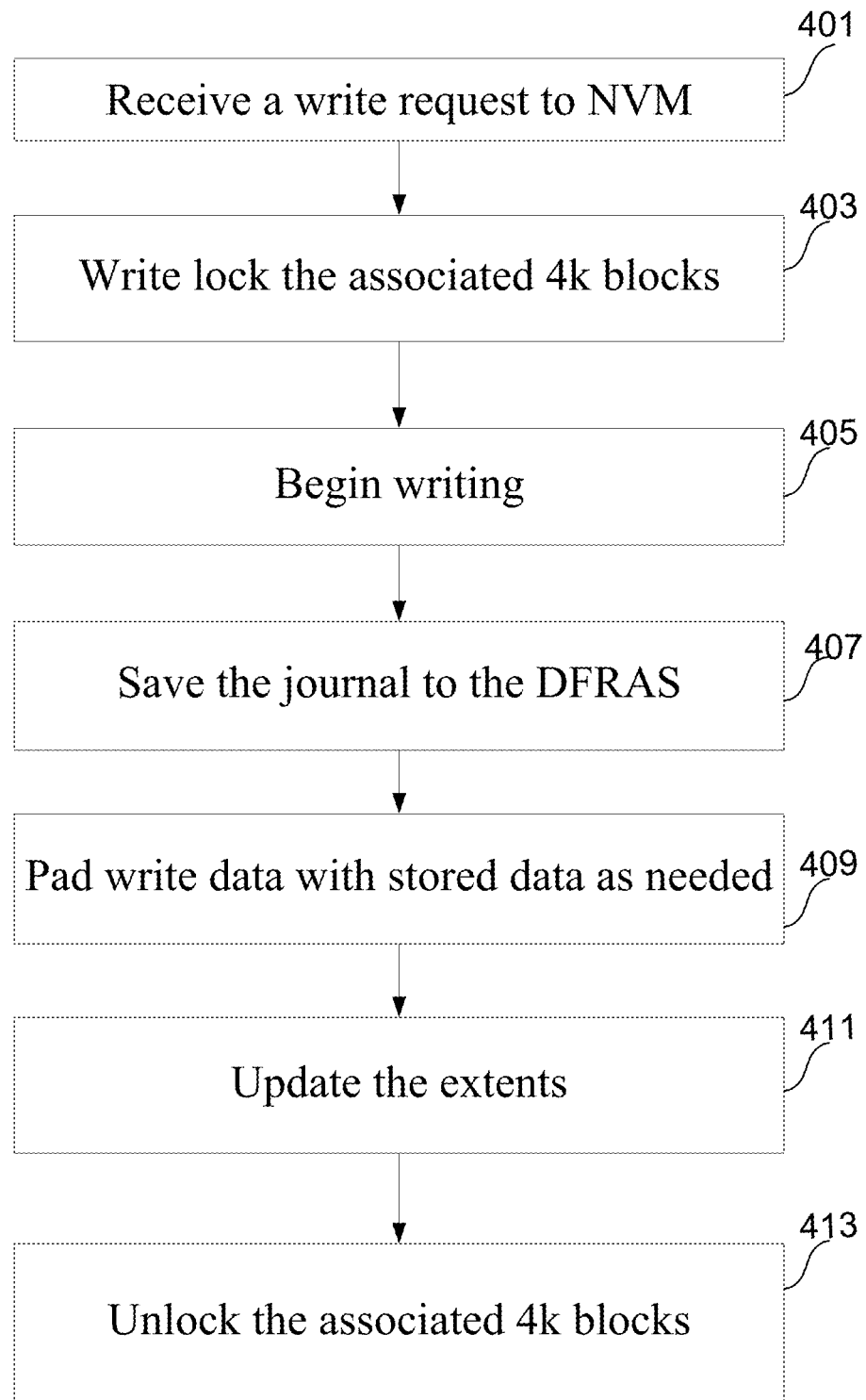
FIG. 4 illustrates an example of a flash registry with write leveling in accordance with an example implementation of this disclosure.
Figure 5:
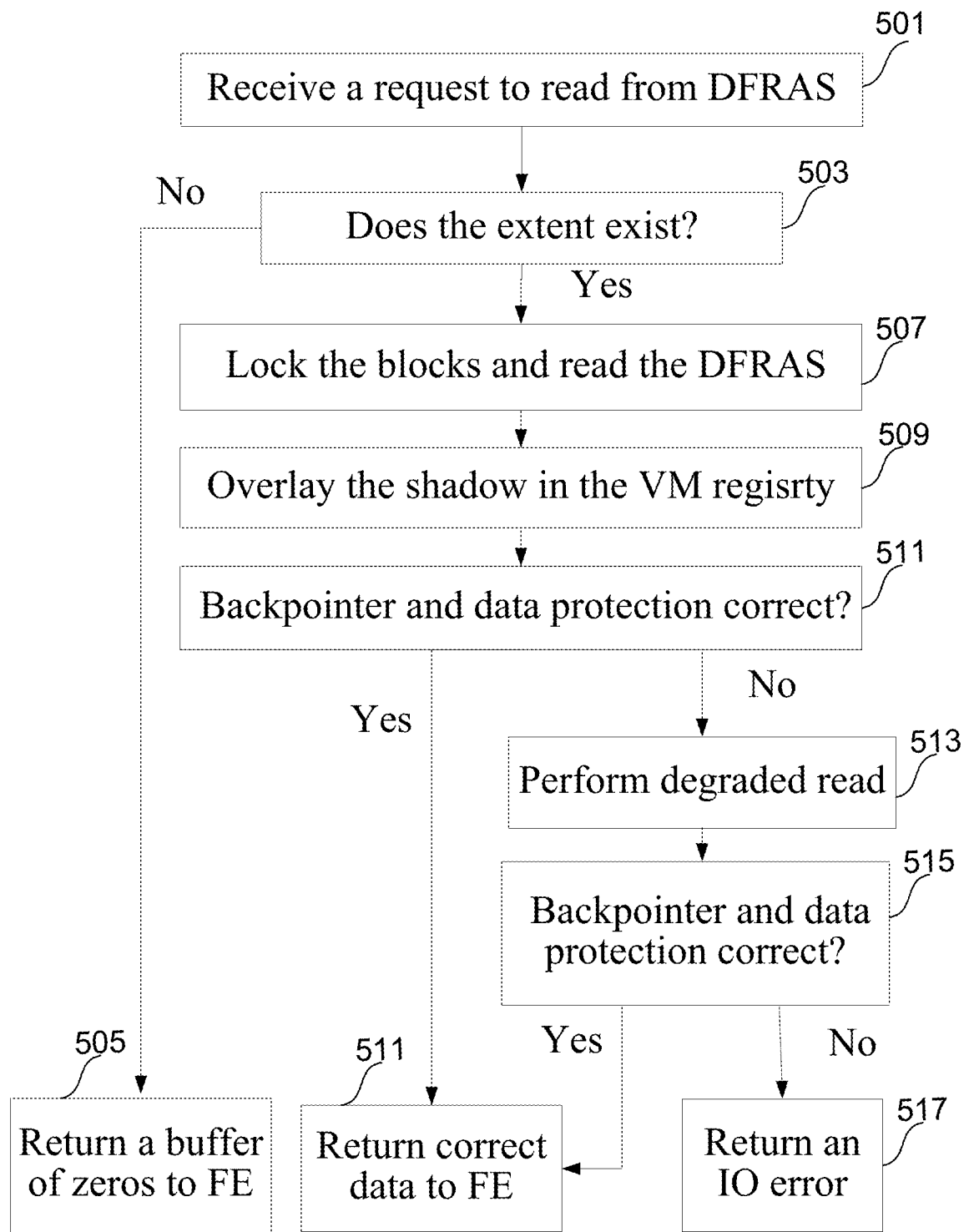
FIG. 5 illustrates an example of a shadow registry associated with the flash registry in FIG. 4 in accordance with an example implementation of this disclosure.

FIG. 3 illustrates another representation of a virtual file system in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual file system, such as described regarding FIG. 2 above. The element 308 represents the one or more physical storage devices 216 which provide the long term storage of the virtual file system.

As shown in FIG. 3, the physical storage is organized into a plurality of distributed failure resilient address spaces (DFRASs) 518. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_J$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re]assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire filesystem metadata space (e.g., directory, file attributes, content range in the file, etc.) can be broken (e.g., chopped or sharded) into small, uniform pieces (e.g., "shards"). For example, a large system with 30k servers could chop the metadata space into 128k or 256k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than $$64,000 \left( \frac{26!}{5! * (26-5)!} \right)$$

possible live-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the filesystem. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Since each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 518) and does not need to cooperate with other buckets to perform read or write operations. There are potentially thousands of concurrent, distributed erasure coding instances working concurrently, each for the different bucket. This is an integral part of scaling performance, as it effectively allows any large filesystem to be divided into independent pieces that do not need to be coordinated, thus providing high performance regardless of the scale.

Each bucket handles all the file systems operations that fall into its shard. For example, the directory structure, file attributes and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

Each 4k block in the file is handled by an object called an extent. The extent ID is based on the inode ID and an offset (e.g., 1 MB) within the file, and managed by the bucket. The extents are stored in the registry of each bucket. The extent ranges are protected by read-write locks. Each extent may manage the content of a contiguous 1 MB for a file, by managing the pointers of up to 256 4k blocks that are responsible for that 1 MB data.

Write Operation

At block 401, an extent in a VFS backend ("BE") receives a write request. The VFS frontend ("FE") calculates the bucket that is responsible for the extent for the 4k write (or aggregated writes). The FE may then send the blocks to the relevant bucket over the network, and that bucket will start handling the write. The block IDs that will be used to write these blocks are requested from the DFRAS in the FIG. 3. If the write contains enough 4k blocks to span several contiguous extents, the first extent receives the entire write request. At block 403, each extent that is part of the write locks the associated 4k blocks in order, for example from the first block of the first extent to the last block of the last extent. Locking is done on a complete 4k block basis, so even if the write specified new data for a portion of a 4k block the complete 4k region is blocked for coherency purposes. Write locking may be very "expensive" and is part of the reason why other systems have limited amount of writes they can perform when they only have a few metadata servers. Because the current disclosure allows an unlimited number of BE's, an unlimited number of 4k writes may be performed concurrently.

If the requested data does not fill a complete 4k block, each 4k block that is touched but not completely overridden is first read. The new data is overlaid over that block and complete 4k blocks may then be written to the DFRAS. For example, the user may write 5k data at an offset of 3584. The first 512 bytes are written on the first 4k block (as the last 512 bytes of it), the second 4k block is completely overridden, and the third 4k block is overridden for its first 512 bytes. The first and third 4k blocks will be first read, the new data will override the correct portions of it, and then three full 4k blocks will actually be written to the DFRAS.

Each block has its EEDP (end-to-end data protection) calculated before it's being written to the DFRAS, and the EEDP information may also be given to the DFRAS so it can make sure that each written block reaches the final NVM destination unaltered with the correct EEDP. If a bit flip occurred over the network or a logical error happened, the end node will receive 4k block data that calculates to a different EEDP data, and thus the DFRAS will know that it needs to resend that data again.

At block 405, once an extent acknowledges the lock, writing may begin. The write lock allows only a single write at a time over each portion of the extent. Two concurrent writes may occur over different ranges of the extent. If an extents is on another bucket, a remote procedure (RPC) call may be used to cause the write to execute in an address space as if it were a local write, e.g., without explicitly coding the details for the remote interaction.

At block 407, the journal is saved to the DFRAS. If possible, the first block written may be compressed to fit the journal. The journal (which is either its own block or within the first block) is updated with the returned block IDs. The first few bytes of the written blocks may actually be replaced by the backpointer to the extent, which later (along with the EEDP) allows the system to make sure that the read data is intact.

At block 409, if the data to be written is not 4k aligned, or not 4k multiple in size, the data may be padded on either (or both) ends of the buffer to a 4k multiple. If the data is padded, existing data is read from the first and/or last block (same block if the write is less than 4k) and the requested written data is padded with the read data, such that complete 4k blocks can be written. In this way small files can be united in the inode and the extent.

At block 411, after the DFRAS are written, the extents are updated with the block IDs, the EEDP, and also the first few bytes of data for all the blocks. The extent may be stored in the registry, and will be destaged to the DFRAS on the next destaging of the registry. At block 413, once all the writes are done, the extent ranges are unlocked in reverse order to the locking order. Once the registry is updated, that data may be read.

Append Operation

A special form of a write is an append. With append, systems gets a blob of data that may be appended at the end of the current data. Doing so from one host with a single writer is not difficult—just find the last offset and perform a write operation. However, append operations may happen concurrently from several FEs, and the system must make sure that each append is consistent within itself. For example, two large append operations must not be allowed to interleave data.

The inode knows which extent is the last extent for the file, and the extent also knows it is the last extent (only one extent may be last). Only the last extent will accept append operations. Any other extent will reject them.

On each append operations the FE goes through the inode to find which is the last extent. If it hit an extent that refused to perform the operation, the FE will go through the inode again to look for the last extent.

When an extent performs appends, it perform each append in full in the order they were received, so when each append start executing the extent finds the last block of data and performs the write (after locking that block). If the append ends after that last extent, the extent will create a new extent in a special mode that may execute just one append before it is "open for use." The extent may then forward the remaining pieces of the data to that extent. That extent becomes the last extent and is marked as open for use. The extent that is not last anymore, will fail all remaining append operations. The remaining append operations will therefore go back to the FE to find who is the last extent from the inode and continue normally. If the write is large enough to span several extents, the last extent will create all extents required in that mode and will forward the correct data to be written to the created extents. Once the all the data is written to all extents, the original extent will mark the last extent of the append as the last and will mark all extents as open for use. The original extent will then go through all pending append operations, which will fail and be sent the originating FE to restart the operation and receive the correct extent.

The semantics of the operations are not affected by the order of concurrent appends. However, it must be ensured that no data will be interleaved between the different writes. If the FE or the inode would find the last offset and perform a standard write, there will be races and the file will end up with inconsistent data in relation to the append operation semantics.

Read Operation

At block 501, the extent in the VFS frontend receives the read request. It calculates and finds out what bucket is responsible for the extent that contains the read, then finds out what backend (node) currently runs that bucket. Then it sends the read request over RPC to that bucket. If a read operation spans more than one extent (more than one continuous 1 MB), the VFS FE may split it into several distinct read operations that will then be aggregated back by the VFS FE. Each such read operation may request the read to happen from a single extent. The VFS FE then sends a read request to the node responsible to the bucket holding that extent.

At block 503, the VFS BE holding the bucket looks up an extent key in the registry. If the extent does not exist, a buffer of zeros is returned at block 505. At block 507, if the extent does exist, the 4k blocks in the extent are read locked and data is read from the DFRAS. At block 509, the registry will overlay a corresponding shadow from of the data from VM (if one exists) over the stored data and return the actual content pointed to by the extent. The shadow of the extent comprises data changes that have not yet been committed to non-volatile memory (e.g., flash SSD). If the requested data is not 4k aligned or not 4k in size, the data is retrieved from the persistent distributed coding scheme, and then the ends may be "chopped" to meet the requested (offset, size).

At block 511, each received block is checked for the backpointer (pointing to the block ID of the extent) and the EEDP (end-to-end-data-protection). If either check fails, the extent requests the blocks from the distributed erasure coding of the bucket to do a degraded mode read at block 513 in which the other blocks of the stripe are read in order to reconstruct the requested block. If the extent exists, it has a list of all the blocks of a stripe that a persistent layer stored. The reconstructed block is checked for the backpointer (pointing to the block ID of the extent) and the EEDP (end-to-end-data-protection) at block 515. At block 517, if either check fails, an IO Error is returned. Once the correct data is confirmed at block 511, it is returned to the requesting FE, after the first few bytes are replaced with the original block data that was stored in the extent and override the backpointer; a new write to the distributed erasure coding system (DECS) is initiated; and the extent with the new block ID also is updated.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A method for accessing storage media, the method comprising:
   maintaining metadata within a plurality of computing devices to map a plurality of memory blocks to a failure resilient address space, wherein:
   the metadata is divided into a plurality of buckets,
   each bucket of the plurality of buckets is associated with a unique group of two or more computing devices selected from the plurality of computing devices,
   the number of buckets in the plurality of buckets is determined according to the number of different pieces the metadata is divided into, and
   the number of different pieces the metadata is divided into is greater than the number of computing devices in the plurality of computing devices;
   reading data from the plurality of memory blocks; and
   checking data read from a particular memory block of the plurality of memory blocks for errors using a distributed erasure code based on blocks identified in an extent.

2. The method of claim 1, wherein the failure resilient address space comprises non-volatile memory.

3. The method of claim 1, wherein the method comprises writing data into the plurality of memory blocks.

4. The method of claim 3, wherein writing data comprises compressing a buffer of data to be written to a first memory block of the plurality of memory blocks to provide space for a journal associated with the data written into the plurality of memory blocks.

5. The method of claim 3, wherein writing data comprises padding a buffer of data to be written to a memory block of the plurality of memory blocks with data previously written into a portion of the memory block.

6. The method of claim 3, wherein in coordination with writing data to a memory block of the plurality of memory blocks, the method comprises updating an extent such that the extent comprises an identification of a plurality of blocks associated with protecting the data being written to the memory block.

7. The method of claim 1, wherein the method comprises performing a degraded data read when the particular memory block of the plurality of memory blocks is found to be in error.

8. The method of claim 7, wherein performing a degraded data read comprises regenerating the particular memory block from one or more memory blocks other than the particular memory block of the plurality of memory blocks.

9. A system comprising:
a plurality of computing devices communicatively coupled to each other via a network, wherein:
the plurality of computing devices is operable to maintain metadata that maps a plurality of memory blocks to a failure resilient address space,
the metadata is divided into a plurality of buckets,
each bucket of the plurality of buckets is associated with a unique group of two or more computing devices selected from the plurality of computing devices,
the number of buckets in the plurality of buckets is determined according to the number of different pieces the metadata is divided into,
the number of different pieces the metadata is divided into is greater than the number of computing devices in the plurality of computing devices,
each of the plurality of computing devices is operable to read data from the plurality of memory blocks, and
a data read from a particular memory block of the plurality of memory blocks is checked for errors using a distributed erasure code based on blocks identified in an extent.

10. The system of claim 9, wherein the plurality of storage devices comprises non-volatile memory.

11. The system of claim 9, wherein each of the plurality of computing devices is operable to write data into the plurality of memory blocks.

12. The system of claim 11, wherein a buffer of data to be written to a first memory block of the plurality of memory blocks is compressed to provide space for a journal associated with the data written into the plurality of memory blocks.

13. The system of claim 11, wherein a buffer of data to be written to a memory block of the plurality of memory blocks is padded with data previously written into a portion of the memory block.

14. The system of claim 11, wherein in coordination with writing data to a memory block of the plurality of memory blocks, an extent is updated, and wherein the updated extent comprises an identification of a plurality of blocks associated with protecting the data being written to the memory block.

15. The system of claim 9, wherein a degraded data read is performed when the particular memory block of the plurality of memory blocks is found to be in error.

16. The system of claim 15, wherein the degraded data read comprises regenerating the particular memory block from one or more memory blocks other than the particular memory block of the plurality of memory blocks.

17. A method for accessing storage media, the method comprising:
maintaining metadata within a plurality of computing devices to map a plurality of memory blocks to a failure resilient address space, wherein:
the metadata is divided into a plurality of buckets,
each bucket of the plurality of buckets is associated with a unique group of two or more computing devices selected from the plurality of computing devices,
the number of buckets in the plurality of buckets is determined according to the number of different pieces the metadata is divided into, and
the number of different pieces the metadata is divided into is greater than the number of computing devices in the plurality of computing devices;
writing data into the plurality of memory blocks; and
writing data comprises padding a buffer of data to be written to a memory block of the plurality of memory blocks with data previously written into a portion of the memory block.

18. The method of claim 17, wherein the failure resilient address space comprises non-volatile memory.

19. The method of claim 17, wherein writing data comprises compressing a buffer of data to be written to a first memory block of the plurality of memory blocks to provide space for a journal associated with the data written into the plurality of memory blocks.

20. The method of claim 17, wherein in coordination with writing data to a memory block of the plurality of memory blocks, the method comprises updating an extent such that the extent comprises an identification of a plurality of blocks associated with protecting the data being written to the memory block.

21. The method of claim 17, wherein the method comprises reading data from the plurality of memory blocks.

22. The method of claim 21, wherein the method comprises:
checking data read from a particular memory block of the plurality of memory blocks for errors using a distributed erasure code based on blocks identified in an extent, and
performing a degraded data read when the particular memory block of the plurality of memory blocks is found to be in error.

23. The method of claim 22, wherein performing a degraded data read comprises regenerating the particular memory block from one or more memory blocks other than the particular memory block of the plurality of memory blocks.

24. A system comprising:
a plurality of computing devices communicatively coupled to each other via a network, wherein:
the plurality of computing devices is operable to maintain metadata that maps a plurality of memory blocks to a failure resilient address space,
the metadata is divided into a plurality of buckets,
each bucket of the plurality of buckets is associated with a unique group of two or more computing devices selected from the plurality of computing devices,
the number of buckets in the plurality of buckets is determined according to the number of different pieces the metadata is divided into,
the number of different pieces the metadata is divided into is greater than the number of computing devices in the plurality of computing devices,
each of the plurality of computing devices is operable to write data into the plurality of memory blocks, and
a buffer of data to be written to a memory block of the plurality of memory blocks is padded with data previously written into a portion of the memory block.

25. The system of claim 24, wherein the plurality of storage devices comprises non-volatile memory.

26. The system of claim 24, wherein a buffer of data to be written to a first memory block of the plurality of memory blocks is compressed to provide space for a journal associated with the data written into the plurality of memory blocks.

27. The system of claim 24, wherein in coordination with writing data to a memory block of the plurality of memory blocks, an extent is updated, and wherein the updated extent comprises an identification of a plurality of blocks associated with protecting the data being written to the memory block.

28. The system of claim 24, wherein each of the plurality of computing devices is operable to read data from the plurality of memory blocks.

29. The system of claim 28, wherein:
a data read from a particular memory block of the plurality of memory blocks is checked for errors using a distributed erasure code based on blocks identified in an extent, and
a degraded data read is performed when the particular memory block of the plurality of memory blocks is found to be in error.

30. The system of claim 29, wherein the degraded data read comprises regenerating the particular memory block from one or more memory blocks other than the particular memory block of the plurality of memory blocks.

31. A method for accessing storage media, the method comprising:
maintaining metadata within a plurality of computing devices to map a plurality of memory blocks to a failure resilient address space, wherein:
the metadata is divided into a plurality of buckets,
each bucket of the plurality of buckets is associated with a unique group of two or more computing devices selected from the plurality of computing devices,
the number of buckets in the plurality of buckets is determined according to the number of different pieces the metadata is divided into, and
the number of different pieces the metadata is divided into is greater than the number of computing devices in the plurality of computing devices,
writing data into the plurality of memory blocks; and
updating an extent such that the extent comprises an identification of a plurality of blocks associated with protecting the data being written to the memory block.

32. The method of claim 31, wherein the failure resilient address space comprises non-volatile memory.

33. The method of claim 31, wherein writing data comprises compressing a buffer of data to be written to a first memory block of the plurality of memory blocks to provide space for a journal associated with the data written into the plurality of memory blocks.

34. The method of claim 31, wherein the method comprises reading data from the plurality of memory blocks.

35. The method of claim 34, wherein the method comprises:
checking data read from a particular memory block of the plurality of memory blocks for errors using a distributed erasure code based on blocks identified in an extent, and
performing a degraded data read when the particular memory block of the plurality of memory blocks is found to be in error.

36. The method of claim 35, wherein performing a degraded data read comprises regenerating the particular memory block from one or more memory blocks other than the particular memory block of the plurality of memory blocks.

37. A system comprising:
a plurality of computing devices communicatively coupled to each other via a network, wherein:
the plurality of computing devices is operable to maintain metadata that maps a plurality of memory blocks to a failure resilient address space,
the metadata is divided into a plurality of buckets,
each bucket of the plurality of buckets is associated with a unique group of two or more computing devices selected from the plurality of computing devices,
the number of buckets in the plurality of buckets is determined according to the number of different pieces the metadata is divided into,
the number of different pieces the metadata is divided into is greater than the number of computing devices in the plurality of computing devices,
each of the plurality of computing devices is operable to write data into the plurality of memory blocks, and
in coordination with writing data to a memory block of the plurality of memory blocks, an extent is updated, and wherein the updated extent comprises an identification of a plurality of blocks associated with protecting the data being written to the memory block.

38. The system of claim 37, wherein the plurality of storage devices comprises non-volatile memory.

39. The system of claim 37, wherein a buffer of data to be written to a first memory block of the plurality of memory blocks is compressed to provide space for a journal associated with the data written into the plurality of memory blocks.

40. The system of claim 37, wherein each of the plurality of computing devices is operable to read data from the plurality of memory blocks.

41. The system of claim 40, wherein:
a data read from a particular memory block of the plurality of memory blocks is checked for errors using a distributed erasure code based on blocks identified in an extent, and
a degraded data read is performed when the particular memory block of the plurality of memory blocks is found to be in error.

42. The system of claim 41, wherein the degraded data read comprises regenerating the particular memory block from one or more memory blocks other than the particular memory block of the plurality of memory blocks.

\* \* \* \* \*